United States Patent
Yerramalli et al.

(10) Patent No.: US 11,006,415 B2
(45) Date of Patent: May 11, 2021

(54) CHANNEL LIST SIGNALING

(71) Applicant: QUALCOMM Incorporated, San Diego, CA (US)

(72) Inventors: Srinivas Yerramalli, San Diego, CA (US); Tamer Kadous, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 16/180,772

(22) Filed: Nov. 5, 2018

(65) Prior Publication Data
US 2019/0141707 A1    May 9, 2019

Related U.S. Application Data

(60) Provisional application No. 62/582,794, filed on Nov. 7, 2017.

(51) Int. Cl.
*H04W 72/04* (2009.01)
*H04W 72/02* (2009.01)
(Continued)

(52) U.S. Cl.
CPC ........ *H04W 72/0453* (2013.01); *H04B 1/713* (2013.01); *H04W 72/02* (2013.01);
(Continued)

(58) Field of Classification Search
CPC ............. H04W 72/0453; H04W 72/02; H04W 72/042; H04W 84/045; H04B 1/713; H04L 5/0094; H04L 5/0012
See application file for complete search history.

(56) References Cited

U.S. PATENT DOCUMENTS

| 2007/0165695 A1* | 7/2007 | Gerhardt | ................ | H04B 1/715 |
| | | | | 375/133 |
| 2011/0142096 A1* | 6/2011 | Gerhardt | ............... | H04W 16/14 |
| | | | | 375/133 |

(Continued)

FOREIGN PATENT DOCUMENTS

WO    2016144143 A1    9/2016

OTHER PUBLICATIONS

International Search Report and Written Opinion—PCT/US2018/059373—ISA/EPO—Feb. 11, 2019.

(Continued)

*Primary Examiner* — Will W Lin
(74) *Attorney, Agent, or Firm* — Harrity & Harrity, LLP

(57) ABSTRACT

A base station (BS) may communicate with a user equipment (UE) using a subset of channels. The BS may select a subset of a set of channels for use in communication with the UE. The BS may transmit, to the UE, a signal to identify the subset of channels. In some aspects, the BS may transmit, and the UE may receive, a channel list indicator identifying the subset of channels. The channel list indicator may include an integer value, which the UE may use to identify a subset of combinatorial factors. Based at least in part on the subset of combinatorial factors, the UE may identify the subset of the set of channels for use in communication with the BS. The UE may communicate with the BS using at least one of the subset of the set of channels, such as in a frequency hopping communication system and/or the like.

30 Claims, 11 Drawing Sheets

(51) Int. Cl.
*H04B 1/713* (2011.01)
*H04W 84/04* (2009.01)
*H04L 5/00* (2006.01)

(52) U.S. Cl.
CPC ......... *H04W 72/042* (2013.01); *H04L 5/0012* (2013.01); *H04L 5/0094* (2013.01); *H04W 84/045* (2013.01)

(56) References Cited

U.S. PATENT DOCUMENTS

2017/0280458 A1* 9/2017 Lou .................. H04W 76/15
2020/0169955 A1* 5/2020 Chang ................ H04W 4/70

OTHER PUBLICATIONS

Samsung: "Definition and Signaling of Narrow-bands", 3GPP Draft; R1-154092 Sub-Bands, 3rd Generation Partnership Project (3GPP), Mobile Competence Centre; 650, Route Des Lucioles; F-06921 Sophia-Antipolis Cedex; France, vol. RAN WG1, No. Beijing, China; Aug. 24, 2015-Aug. 28, 2015 Aug. 23, 2015 (Aug. 23, 2015), XP051001462, Retrieved from the Internet: URL:http://www.3gpp.org/ftp/Meetings_3GPP_SYNC/RAN1/Docs/ [retrieved on Aug. 23, 2015], 3 pages.

* cited by examiner

CHANNEL LIST SIGNALING

CROSS-REFERENCE TO RELATED APPLICATIONS UNDER 35 U.S.C. § 119

This application claims priority to U.S. Provisional Patent Application No. 62/582,794, filed on Nov. 7, 2017, entitled TECHNIQUES AND APPARATUSES FOR CHANNEL LIST SIGNALING," which is hereby expressly incorporated by reference herein.

BACKGROUND

Field

Aspects of the present disclosure generally relate to wireless communication, and more particularly to techniques and apparatuses for channel list signaling.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

A BS and a UE may communicate using at least one of a set of channels associated with a set of frequencies. For example, in a frequency-hopping communication system, the BS and the UE may use a subset of channels associated with a subset of frequencies for communication. The BS may select, from a set of channels available for communication, a subset of the set of channels associated with a subset of frequencies for use in the frequency-hopping communication system. For example, the BS may select 5 channels from a set of 10 channels for use in frequency hopping. The BS may provide a channel list indicator to the UE to identify the subset of channels that are to be used for communication.

It had been considered to have the BS provide a bitmap identifying the subset of the set of channels that are to be used for communication. In this case, each bit may represent a channel, and may be set to indicate whether the channel is to be used for communication. However, as a quantity of channels increases, a quantity of bits of the channel list indicator that are required to identify the subset of channels that are to be used for communication may increase, which may cause an excessive utilization of network resources to transmit the channel list indicator. For example, for a set of 14 possible channels, from which 4 channels are to be selected for communication, the BS may provide a 14 bit channel list indicator.

It had also been considered to have the BS provide a channel list indicator including a quantity of bits identifying an index value. For example, the BS may identify the index value to the UE, and the UE may use a lookup table to determine the subset of channels based at least in part on the index value. In this case, for a set of 14 possible channels, from which 4 channels are to be selected for communication, the possible combinations of channels for communication can be identified using a 10 bit channel list indicator. However, storing the lookup table may cause the UE to use excessive memory resources. Moreover, transmitting an updated lookup table after a change to the set of channels may cause an excessive utilization of network resources.

SUMMARY

Some aspects described herein provide a mechanism by which a BS may transmit, and a UE may receive, a channel list indicator that identifies a subset of a set of channels for use in communication. The BS may select the subset of channels, and may map indices representing the subset of channels to a single integer value using a combinatorial number system. In this case, each index representing a channel of the subset of channels may be a combinatorial factor of the combinatorial number system. The BS may provide a channel list indicator identifying the single integer value, and the UE may determine the combinatorial factors based at least in part on the single integer value. Based at least in part on determining the combinatorial factors, the UE may identify the indices representing the subset of channels, and may identify the subset of channels for communication. In this way, the UE may reduce a quantity of bits that are to be provided to identify the subset of channels, and may obviate a need for an excessively large lookup table to determine the subset of channels based at least in part on a lookup table index identifying the subset of channels.

In an aspect of the disclosure, methods, a user equipment, a base station, apparatuses, and computer program products are provided.

In some aspects, the method may include receiving from a base station, by a user equipment, a channel list indicator corresponding to a subset of channels of a set of channels, for frequency hopping, wherein the channel list indicator is a bit indicator identifying a set of combinatorial factors identifying the subset of channels. The method may include attempting, by the user equipment, to communicate with the base station using at least one channel of the subset of channels identified by the channel list indicator.

In some aspects, the user equipment may include a memory and one or more processors operatively coupled to the memory. The memory and the one or more processors may be configured to receiving from a base station a channel list indicator corresponding to a subset of channels of a set of channels, for frequency hopping, wherein the channel list indicator is a bit indicator identifying a set of combinatorial factors identifying the subset of channels. The memory and the one or more processors may be configured to attempt to communicate with the base station using at least one channel of the subset of channels identified by the channel list indicator.

In some aspects, the apparatus may include means for receiving from a base station a channel list indicator corresponding to a subset of channels of a set of channels, for frequency hopping, wherein the channel list indicator is a bit indicator identifying a set of combinatorial factors identifying the subset of channels. The apparatus may include means for attempting to communicate with the base station using at least one channel of the subset of channels identified by the channel list indicator.

In some aspects, the computer program product may include a non-transitory computer-readable medium storing computer executable code. The code may include code for receiving from a base station a channel list indicator corresponding to a subset of channels of a set of channels, for frequency hopping, wherein the channel list indicator is a bit indicator identifying a set of combinatorial factors identifying the subset of channels. The code may include code for attempting, by the user equipment, to communicate with the base station using at least one channel of the subset of channels identified by the channel list indicator.

In some aspects, the method may include transmitting, by a base station, a channel list indicator corresponding to a subset of channels of a set of channels for a user equipment to attempt to communicate with the base station using frequency hopping, wherein the channel list indicator is a bit indicator identifying a set of combinatorial factors identifying the subset of channels. The method may include attempting, by the base station, to communicate with the user equipment using at least one channel of the set of channels identified by the channel list indicator.

In some aspects, the base station may include a memory and one or more processors operatively coupled to the memory. The memory and the one or more processors may be configured to transmit a channel list indicator corresponding to a subset of channels of a set of channels for a user equipment to attempt to communicate with the base station using frequency hopping, wherein the channel list indicator is a bit indicator identifying a set of combinatorial factors identifying the subset of channel. The memory and the one or more processors may be configured to attempt to communicate with the user equipment using at least one channel of the set of channels identified by the channel list indicator.

In some aspects, the apparatus may include means for transmitting a channel list indicator corresponding to a subset of channels of a set of channels for a user equipment to attempt to communicate with the base station using frequency hopping, wherein the channel list indicator is a bit indicator identifying a set of combinatorial factors identifying the subset of channel. The apparatus may include means for attempting to communicate with the user equipment using at least one channel of the set of channels identified by the channel list indicator.

In some aspects, the computer program product may include a non-transitory computer-readable medium storing computer executable code. The code may include code for transmitting a channel list indicator corresponding to a subset of channels of a set of channels for a user equipment to attempt to communicate with the base station using frequency hopping, wherein the channel list indicator is a bit indicator identifying a set of combinatorial factors identifying the subset of channel. The code may include code for attempting to communicate with the user equipment using at least one channel of the set of channels identified by the channel list indicator.

Aspects generally include a method, apparatus, system, computer program product, non-transitory computer-readable medium, user equipment, base station, wireless communication device, access point, and processing system as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
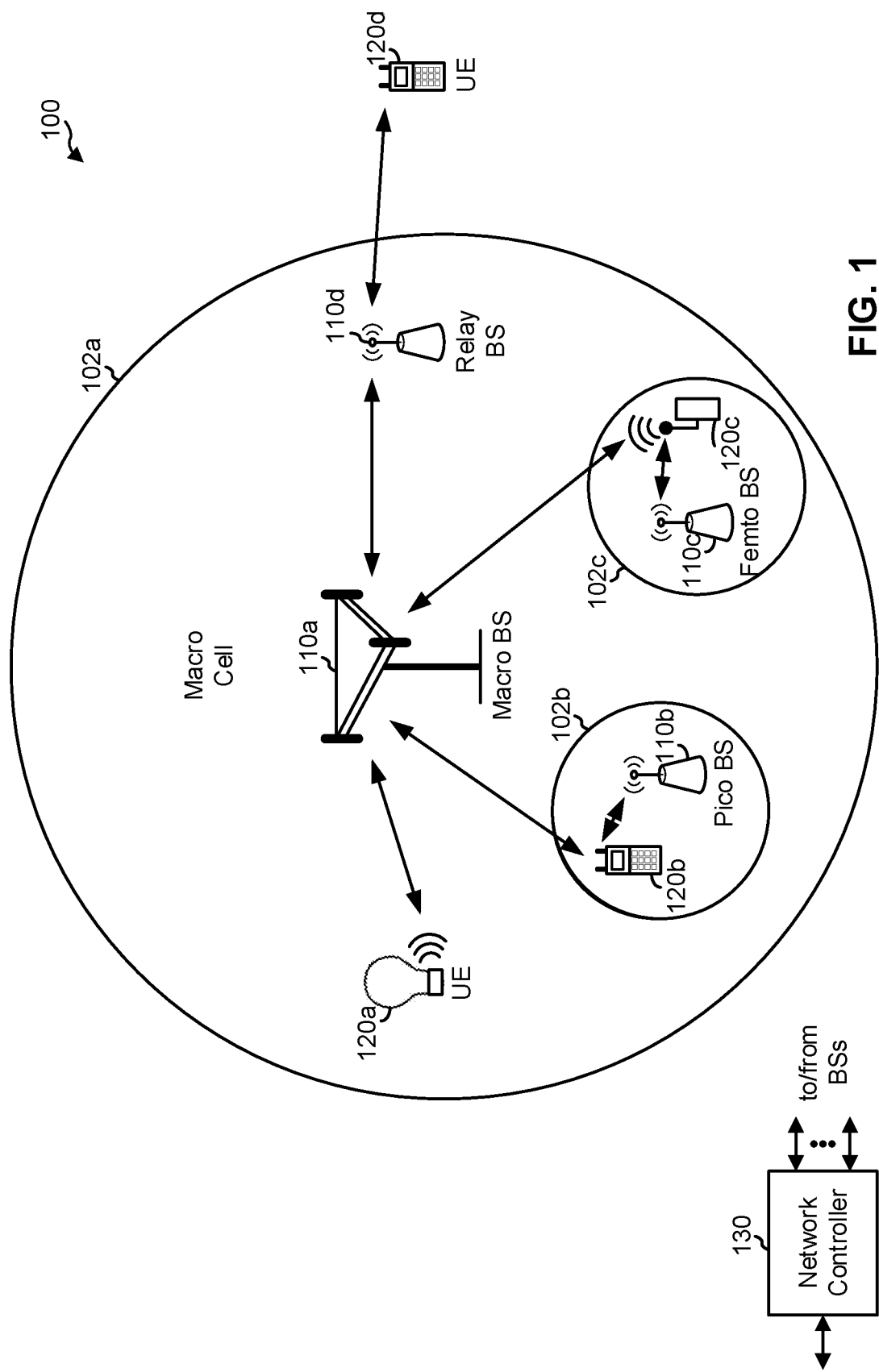
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may determine a subset of a set of channels that are to be used by BS 110 and UE 120 for frequency hopping communication.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone, such as UEs 120b and/or 120d), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices (e.g., such as UE 120c), wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, a smart home device (e.g., a smart appliance, a smart light bulb, and/or the like, such as UE 120a), or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. For example, UE 120 may be an eMTC UE operating on an eMTC unlicensed (eMTC-U) spectrum band. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband interne of things) devices. For example, UE 120 may be an NB-IoT UE operating on an NB-IoT unlicensed (NB-IoT-U) spectrum band. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
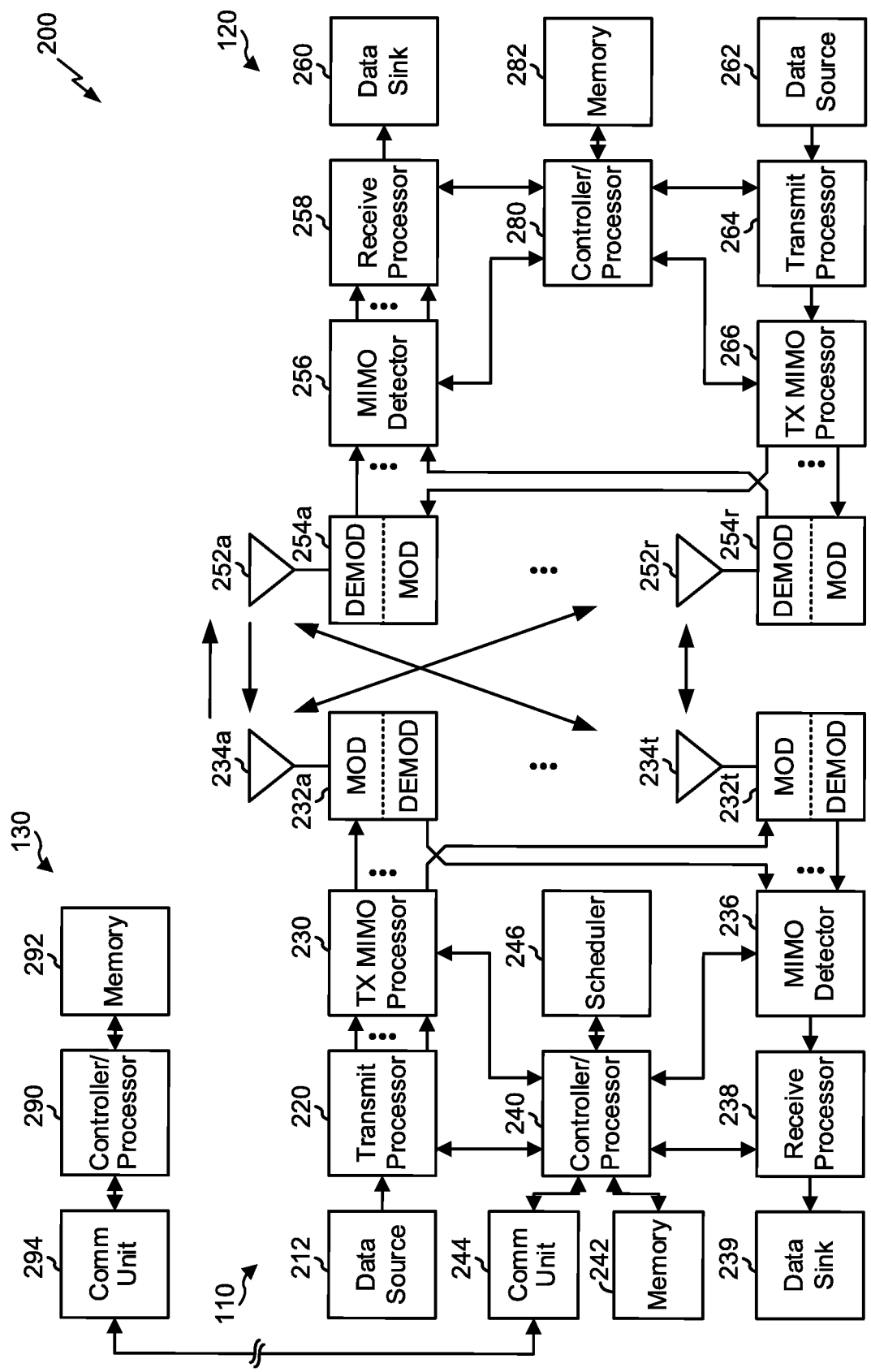
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. For example, UE 120 may receive a downlink signal including a channel list indicator, based at least in part on which UE 120 may determine a subset of a set of channels on which to communicate with BS 110. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with channel list signaling, as described in more detail elsewhere herein. For example, controller/processor 240 of base station 110, controller/processor 280 of UE 120, and/or any other component(s) of FIG. 2 may perform or direct operations of, for example, method 600 of FIG. 6, method 900 of FIG. 9, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

Figure 3:
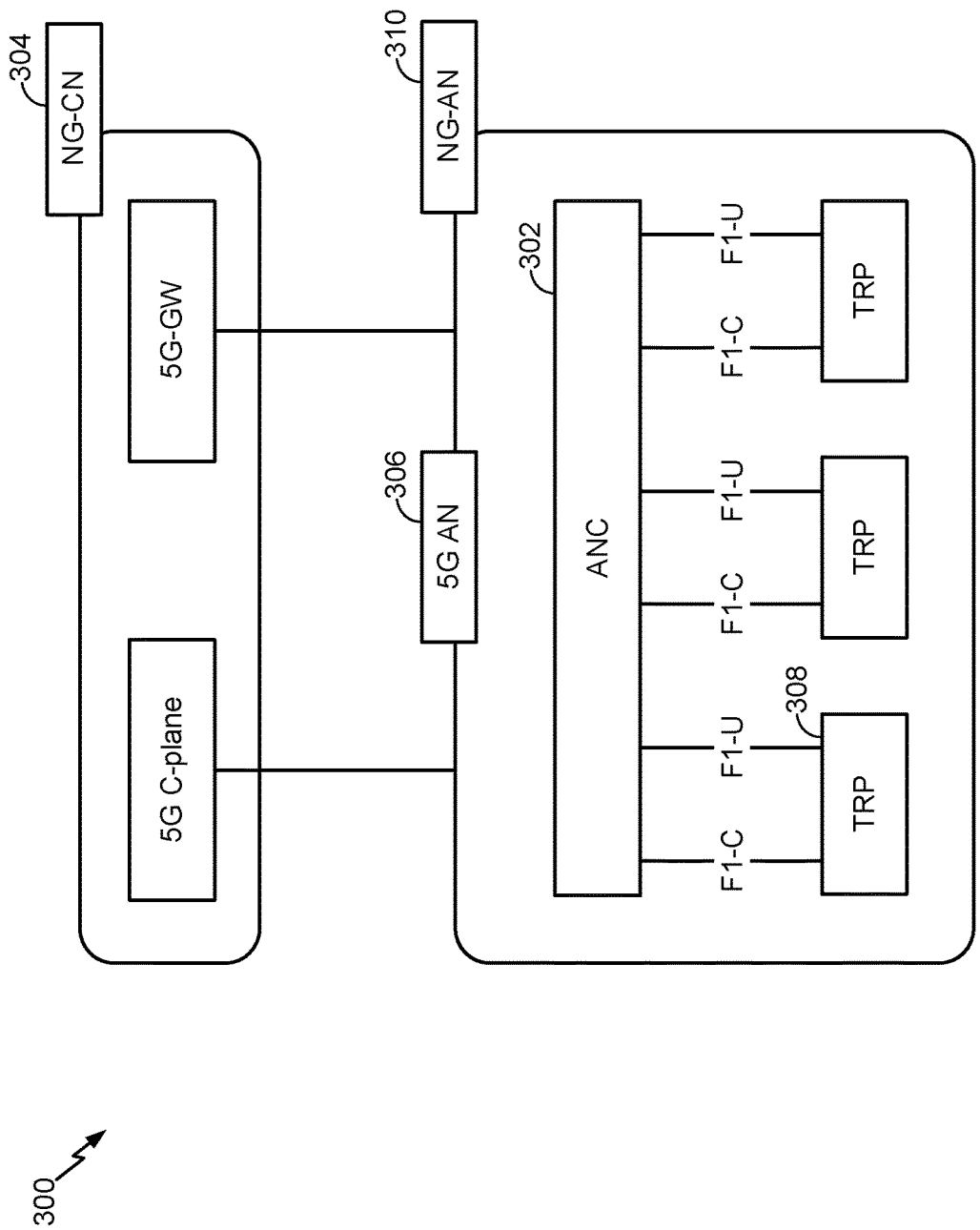
FIG. 3 is a diagram illustrating an example logical architecture of a distributed radio access network (RAN).

FIG. 3 illustrates an example logical architecture of a distributed RAN 300, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, 5G BSs, Node Bs, 5G NBs, APs, gNB, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 300 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 310 may support dual connectivity with 5G. The NG-AN may share a common fronthaul for LTE and 5G.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of RAN 300. The PDCP, RLC, MAC protocol may be adaptably placed at the ANC or TRP.

According to various aspects, a BS may include a central unit (CU) (e.g., ANC 302) and/or one or more distributed units (e.g., one or more TRPs 308).

As indicated above, FIG. 3 is provided merely as an example. Other examples are possible and may differ from what was described with regard to FIG. 3.

Figure 4:
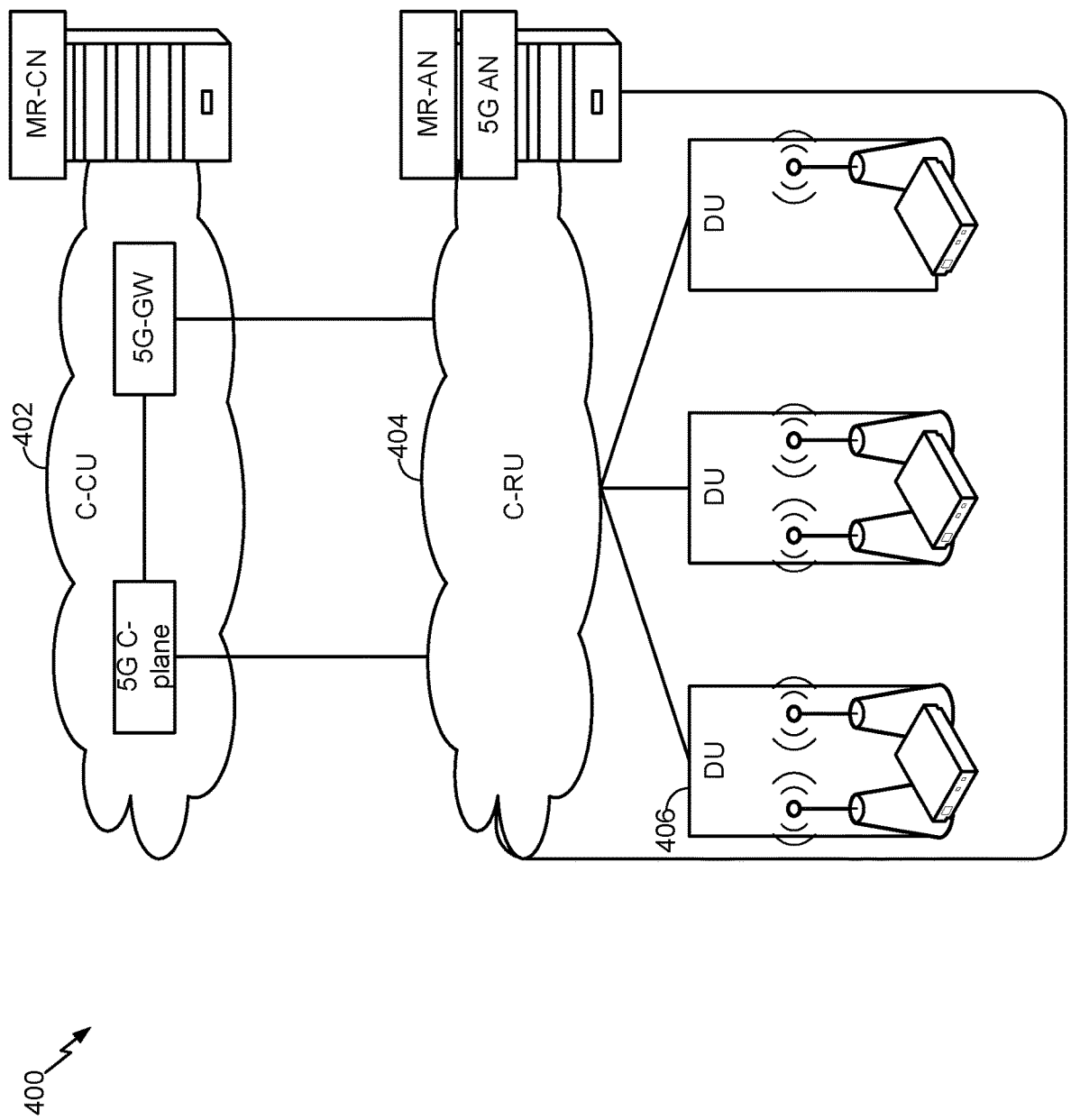
FIG. 4 is a diagram illustrating an example physical architecture of a distributed RAN.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity.

A centralized RAN unit (C-RU) 404 may host one or more ANC functions. Optionally, the C-RU may host core network functions locally. The C-RU may have distributed deployment. The C-RU may be closer to the network edge.

A distributed unit (DU) 406 may host one or more TRPs. The DU may be located at edges of the network with radio frequency (RF) functionality.

As indicated above, FIG. 4 is provided merely as an example. Other examples are possible and may differ from what was described with regard to FIG. 4.

Figure 5:
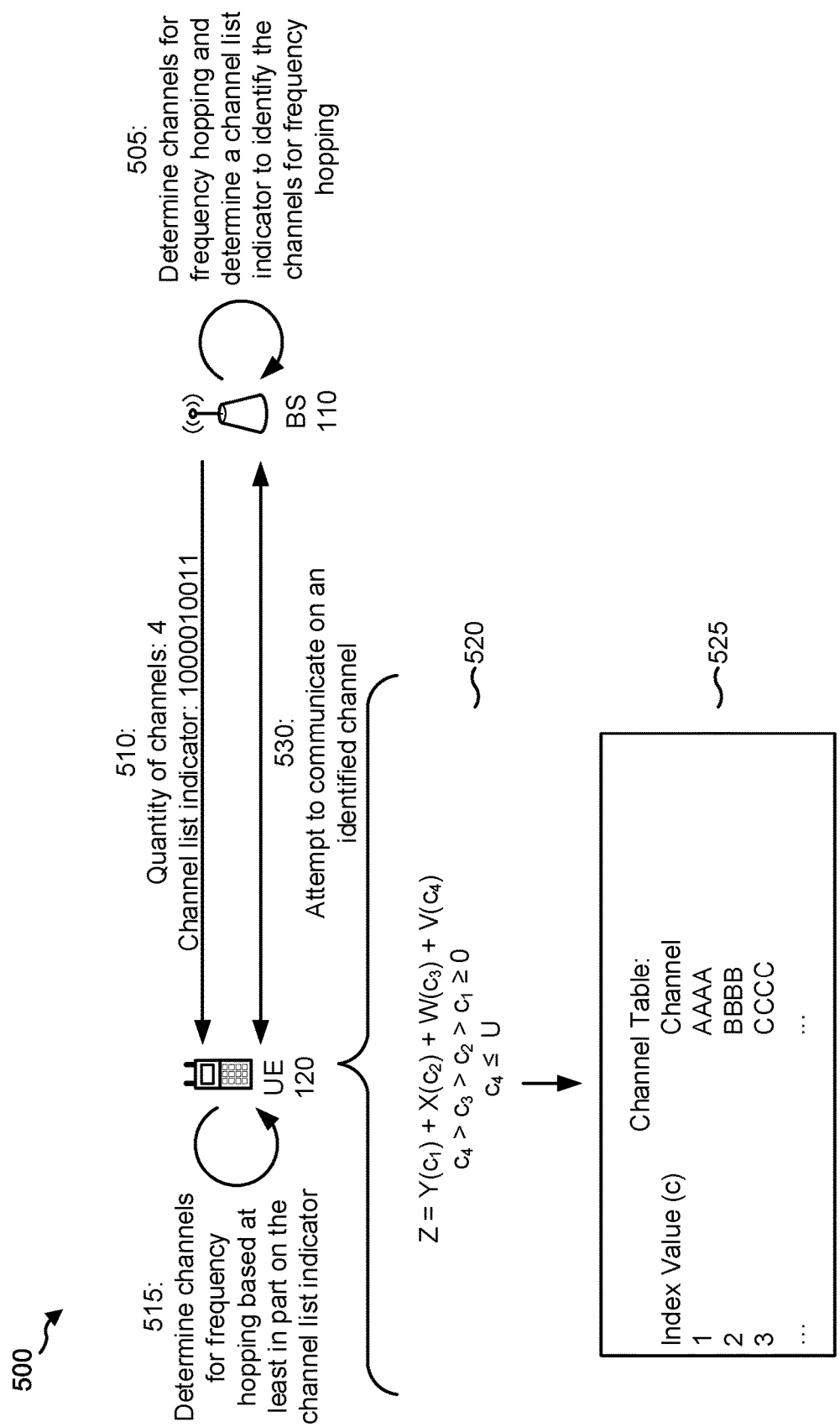
FIG. 5 is a diagram illustrating an example of channel list signaling.

FIG. 5 is a diagram illustrating an example 500 of channel list signaling. As shown in FIG. 5, example 500 includes a BS 110 in communication with a UE 120.

At 505, BS 110 may determine channels for frequency hopping and determine a channel list indicator to identify the channels for frequency hopping. For example, BS 110 may select a subset of channels for use in frequency hopping communication with UE 120, and may generate a channel list indicator to identify the subset of channels. In this case, BS 110 may identify an integer value, L, based at least in part on an equation of a combinatorial number system encoding procedure:

$$L = \binom{N-c_1}{k} + \binom{N-c_2}{k-1} + \ldots + \binom{N-c_k}{1};$$

$$c_k > c_{k-1} > \ldots > c_1 \geq 0;$$

$$c_k \leq N;$$

where N represents a quantity of channels from which the subset of channels is to be selected, k represents a quantity of channels that are to be selected from the set of channels as the subset of channels, and $c_i$ represents a combinatorial factor corresponding to an index of a channel i of the subset of channels. In some aspects, BS 110 may generate a channel list indicator that includes a bit indicator. For example, BS 110 may determine a bit indicator that identifies L using a set of binary bits.

At 510, BS 110 may provide, and UE 120 may receive, a channel list indicator. For example, BS 110 may provide, and UE 120 may receive, a channel list indicator that includes a bit indicator to identify a particular integer value for L. In some aspects, BS 110 and UE 120 may allocate a particular amount of resources for the channel list indicator. For example, UE 120 may allocate a particular quantity of bits in which to receive the channel list indicator based at least in part on a maximum quantity of bits that may be needed to identify L. In this case, when the quantity of bits used for the channel list indicator is less than the quantity of bits allocated to receive the channel list indicator, UE 120 may discard one or more non-usable bits, and may decode the usable bits to determine L. In some aspects, BS 110 may provide, and UE 120 may receive the channel list indicator and an indicator of a quantity of channels that are to be selected as a subset of channels for frequency hopping in a common message. For example, BS 110 may provide a master information block (MIB) message identifying the quantity of channels (e.g., 4 channels) that are to be selected from the set of possible channels (e.g., 14 channels), and the channel list indicator to identify L.

In some aspects, BS 110 may provide, and UE 120 may receive, multiple messages to identify the quantity of channels and the channel list indicator. For example, BS 110 may provide an indicator of the quantity of channels via a MIB message, and may provide the channel list indicator via a system information block (SIB) message, such as a SIB message on an anchor channel. In this case, the anchor channel may be used for discovery, and the SIB message on the anchor channel may be decoded after decoding the MIB. In some aspects, BS 110 may provide a channel list indicator that identifies one or more channels that are not to be used for frequency hopping communication. For example, when a quantity of bits to identify the one or more channels that are not to be used for frequency hopping communication is less than the quantity of bits to identify the subset of channels that are to be used for frequency hopping, BS 110 may signal the one or more channels that are not to be used for frequency hopping, thereby reducing a utilization of network resources.

At 515, UE 120 may determine the channels for frequency hopping based at least in part on the channel list indicator. For example, UE 120 may receive the channel list indicator, and may determine that the channel list indicator value L (e.g., shown as L=531). In this case, UE 120 may determine the group of combinatorial factors based at least in part on the channel list indicator value, the quantity of channels that are to be selected (e.g., 4), and the quantity of channels from which the channels are to be selected (e.g., 14).

At 520, UE 120 may determine a set of equations:

$$Z = Y(c_1) + X(c_2) + W(c_3) + V(c_4),$$

$$c_4 > c_3 > c_2 \geq 0,$$

$$c_4 \leq U,$$

where Z and U are constant values; Y, X, W, and V are functions; and $c_1$, $c_2$, $c_3$, and $c_4$ are combinatorial factors, as described in more detail above, such that the set of equations may be calculated as:

$$531 = \binom{14-c_1}{4} + \binom{14-c_2}{4-1} + \binom{14-c_3}{2} + \binom{14-c_4}{1}$$

$$c_4 > c_3 > c_2 > c_1 \geq 0,$$

$$c_4 \leq 14.$$

In this case, UE 120 may determine values for combinatorial factors $c_1$, $c_2$, $c_3$, and $c_4$ to determine indices for the subset of channels. For example, UE 120 may utilize a combinatorial number system technique, such as using a greedy algorithm or another combinatorics technique. In this case, each value for L may correspond to a single group of combinatorial factors $c_i$ resulting in the channel list indicator uniquely identifying a subset of channels that were selected by BS 110 for use in frequency hopping. Although some aspects, described herein, are described in terms of a particular quantity of combinatorial factors and/or a particular set of values, other quantities of combinatorial values or sets of values may be possible.

In some aspects, the set of combinatorial factors may be based at least in part on a quantity of channels from which the subset of channels is to be selected, a quantity of channels that are to be selected from the set of channels as the subset of channels, a combinatorial number system encoding procedure, and/or the like.

At 525, UE 120 may identify the subset of channels based at least in part on a subset of indices corresponding to the values for combinatorial factors $c_1$, $c_2$, $c_3$, and $c_4$. For example, a first combinatorial factor $c_1$ may be associated with an index value 2, which may correspond to a channel BBBB (e.g., a first frequency), which UE 120 may select for use in channel hopping; a second combinatorial factor $c_2$ may be associated with an index value 3, which may correspond to a channel CCCC (e.g., a second frequency), which UE 120 may select for use in channel hopping; and/or the like.

At 530, UE 120 may attempt to communicate on an identified channel. For example, UE 120 may attempt to transmit information to and/or receive information from BS 110 using a frequency corresponding to at least one channel of the channels identified based at least in part on the combinatorial factors. In this way, UE 120 may identify channels for a frequency hopping communication system, and communicate with BS 110 in the frequency hopping communication system.

As indicated above, FIG. 5 is provided as an example. Other examples are possible and may differ from what was described with respect to FIG. 5.

Figure 6:
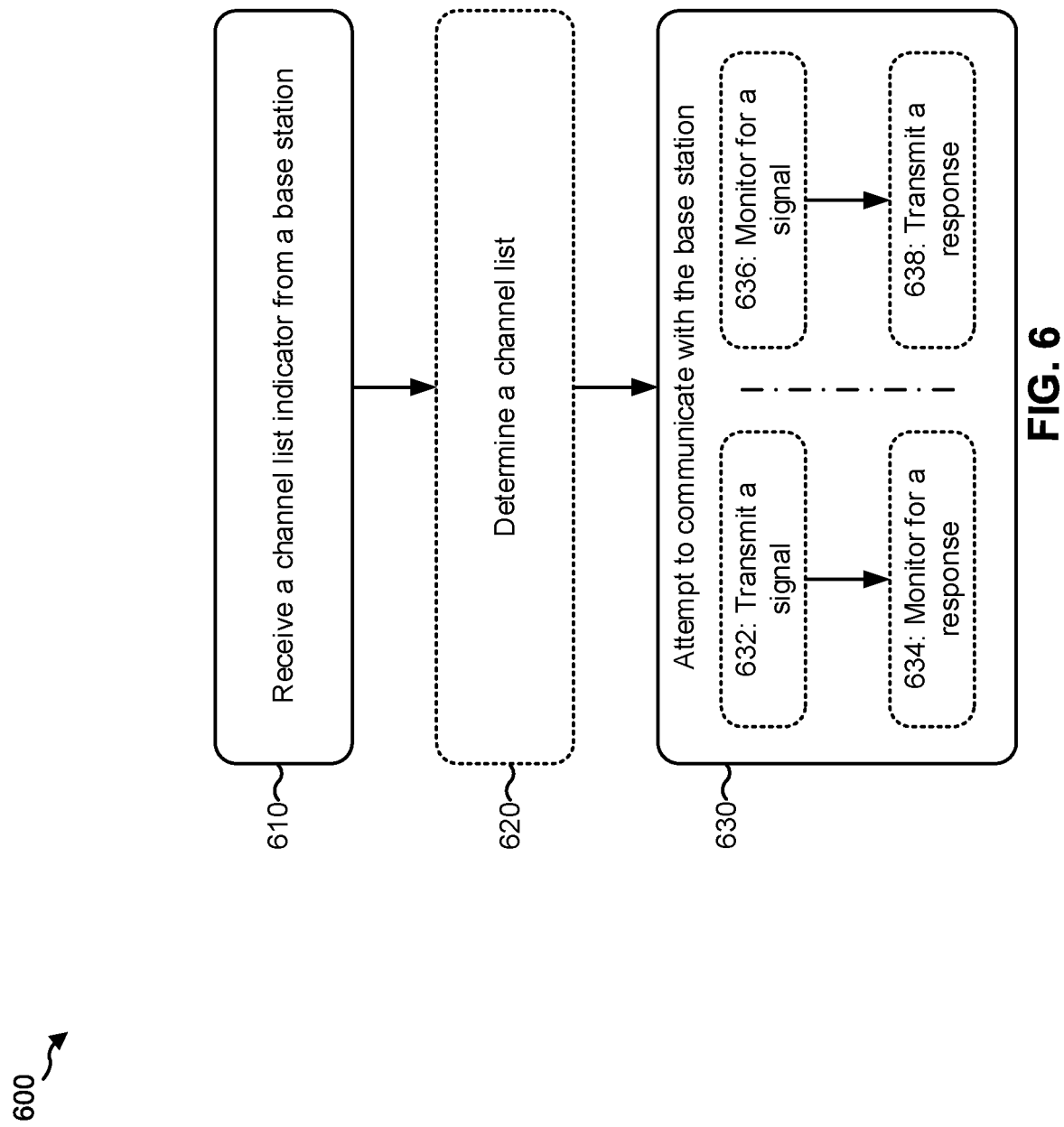
FIG. 6 is a flow chart of a method of wireless communication.

FIG. 6 is a flow chart of a method 600 of wireless communication. The method may be performed by a user equipment (e.g., the UE 120 of FIG. 1, the apparatus 702/702', the UE 1050 of FIG. 10, and/or the like).

At 610, in some aspects, the user equipment may receive a channel list indicator from a base station. For example, the user equipment (e.g., using antenna 252, DEMOD 254, MIMO detector 256, receive processor 258, controller/processor 280, and/or the like) may receive the channel list indicator, which is associated with identifying a subset of channels of a set of channels for use in frequency hopping communication, from the base station, as described in more detail above.

At 620, in some aspects, the user equipment may determine a channel list. For example, the user equipment (e.g., using controller/processor 280 and/or the like) may determine the channel list, of a subset of channels of a set of channels, for frequency hopping based at least in part on a channel list indicator, for the channel list, received from a base station, wherein the channel list indicator is a bit indicator identifying a set of combinatorial factors identifying the subset of channels, as described in more detail above.

At 630, in some aspects, the user equipment may attempt to communicate with the base station. For example, the user equipment may (e.g., using antenna 252, DEMOD 254, MIMO detector 256, receive processor 258, controller/processor 280, transmit processor 264, TX MIMO processor 266, MOD 254, antenna 252, and/or the like) attempt to communicate with the base station using at least one channel of the subset of channels based at least in part on identifying a channel list, as described in more detail above.

At 632 and 634, in some aspects, the user equipment may transmit a signal, and may monitor for a response. For example, the user equipment (e.g., using antenna 252, DEMOD 254, MIMO detector 256, receive processor 258, controller/processor 280, transmit processor 264, TX MIMO processor 266, MOD 254, antenna 252, and/or the like) may attempt to communicate with the base station by transmitting a signal to the base station using the at least one channel of the subset of channels, and by monitoring for a response from the base station using the at least one channel of the subset of channels, as described in more detail above.

At 636 and 638, in some aspects, the user equipment may monitor for a signal, and may transmit a response. For example, the user equipment (e.g., using antenna 252, DEMOD 254, MIMO detector 256, receive processor 258, controller/processor 280, transmit processor 264, TX MIMO processor 266, MOD 254, antenna 252, and/or the like) may attempt to communicate with the base station by monitoring for a signal from the base station using the at least one channel of the subset of channels, and by transmitting, to the base station, a response to the signal using the at least one channel of the subset of channels, as described in more detail above.

Method 600 may include additional aspects, such as any single aspect or any combination of aspects described below and/or in connection with one or more other processes described elsewhere herein.

In some aspects, a quantity of channels from which the channel list is selected is static. In some aspects, a quantity of bits of the bit indicator is based at least in part on a greatest quantity of bits to be used for the channel list indicator. In some aspects, a quantity of channels of the subset of channels is signaled using a master information block message.

In some aspects, the channel list is based at least in part on a quantity of channels from which the channel list is selected. In some aspects, the channel list indicator and a channel quantity indicator of a quantity of channels from which the channel list is selected are signaled in a common message. In some aspects, the channel list indicator is signaled using a system information block message or a master information block message transmitted on an anchor channel and an indicator of a quantity of channels in the subset of channels is signaled using another channel.

In some aspects, the channel list indicator is signaled and decoded after an alteration to the channel list. In some aspects, the set of combinatorial factors identifies one or more channels not to be included in the channel list and the subset of channels of the channel list is based at least in part on the one or more channels not to be included in the channel list. In some aspects, the set of combinatorial factors is based at least in part on a quantity of channels from which the subset of channels is to be selected. In some aspects, the set of combinatorial factors is based at least in part on a quantity of channels that are to be selected from the set of channels as the subset of channels.

Although FIG. 6 shows example blocks of a method of wireless communication, in some aspects, the method may include additional blocks, fewer blocks, different blocks, or differently arranged blocks than those shown in FIG. 6. Additionally, or alternatively, two or more blocks shown in FIG. 6 may be performed in parallel.

Figure 7:
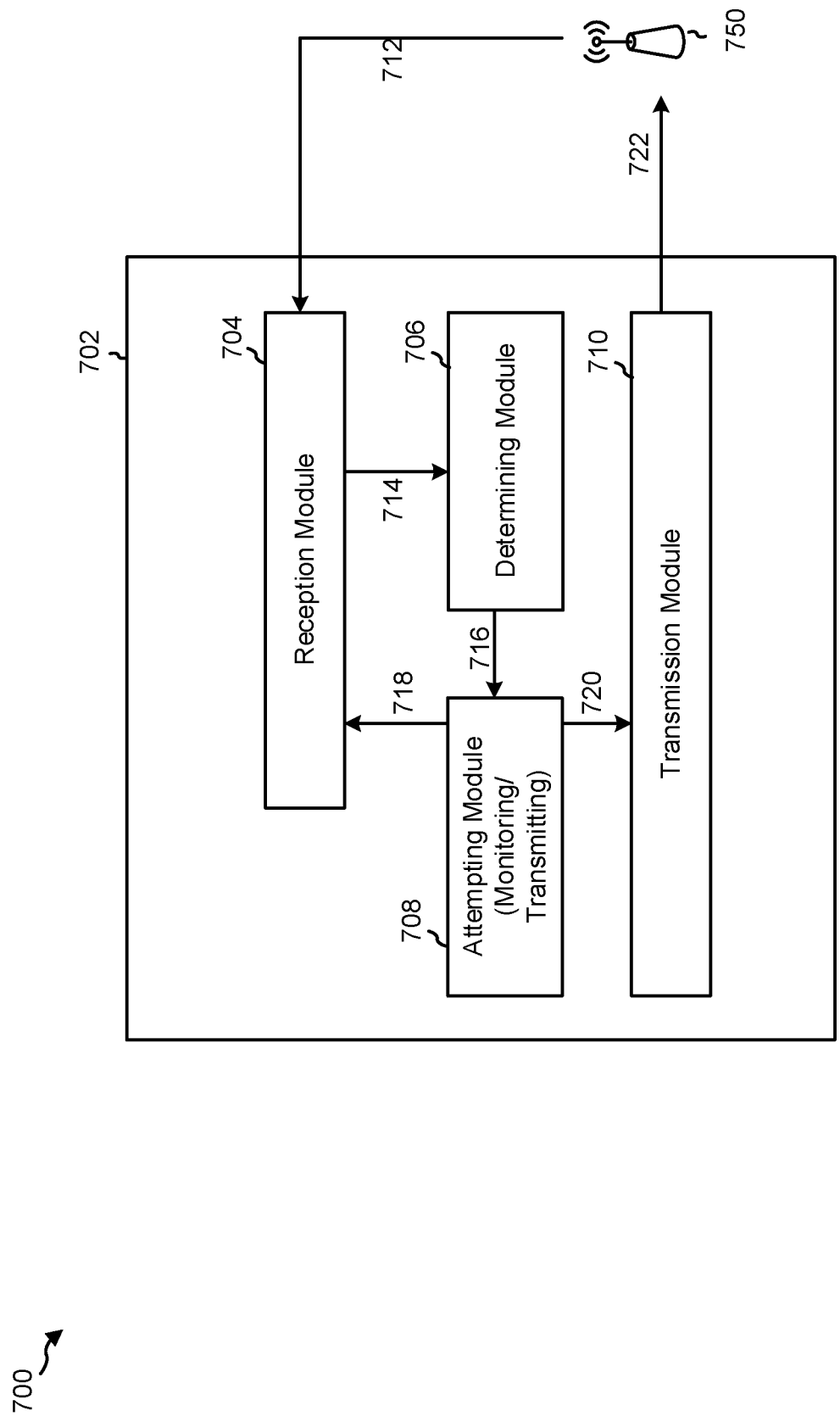
FIG. 7 is a conceptual data flow diagram illustrating the data flow between different modules/means/components in an example apparatus.

FIG. 7 is a conceptual data flow diagram 700 illustrating the data flow between different modules/means/components in an example apparatus 702. The apparatus 702 may be a UE. In some aspects, the apparatus 702 includes a reception module 704, a determining module 706, an attempting module 708, and/or a transmission module 710.

The reception module 704 may receive, from base station 750 and as data 712, information associated with determining a channel list. For example, the reception module 704 may receive a channel list indicator. In some aspects, the reception module 704 may receive a bit indicator identifying an integer value corresponding to a set of combinatorial factors, which correspond to a set of channels that the apparatus 702 is to use in communicating with the base station 750. In some aspects, the reception module 704 may receive a MIB message identifying a quantity of channels that the apparatus 702 is to select for the channel list, a MIB identifying the channel list indicator, a SIB identifying the channel list indicator (e.g., on an anchor channel), and/or the like. In some aspects, the reception module 704 may receive information from base station 750 using at least one channel of the channel list based at least in part on the apparatus 702 determining the channel list.

The determining module 706 may receive, from the reception module 704 and as data 714, information associated with determining the channel list. For example, the determining module 706 may receive a decoded channel list indicator based at least in part on the reception module 704 receiving the channel list indicator from the base station 750 and decoding the channel list indicator. In some aspects, the determining module 706 may determine the channel list. For example, based at least in part on the channel list indicator, information identifying a quantity of channels from which one or more channels are to be selected, information identifying a quantity of channels that are to be selected, and/or the like, the determining module 706 may determine a set of combinatorial factors identifying a set of channel indices, and may determine a set of channels corresponding to the set of channel indices.

The attempting module 708 may receive, from the determining module 706 and as data 716, information identifying a set of channels with which to attempt to communicate. For example, based at least in part on the determining module 706 identifying the channel list, the attempting module 708 may provide data 718 and data 720 to the reception module 704 and the transmission module 710, respectively, to enable the reception module 704 and the transmission module 710 to communicate with base station 750, such as in a frequency hopping communication system. In some aspects, the attempting module 708 may cause the reception module 704 to monitor for a signal (e.g., the attempting module 108 may attempt to receive a signal from the base station 750) and/or may cause the transmission module 710 to transmit a signal (e.g., the attempting module 108 may attempt to transmit the signal to the base station 750).

The transmission module 710 may provide, to base station 750 and as data 722, communications. For example, based at least in part on the attempting module 708 attempting to communicate using at least one channel of the channel list, the transmission module 710 may transmit data to base station 750 to communicate with base station 750.

The apparatus may include additional modules that perform each of the blocks of the algorithm in the aforementioned flow chart of FIG. 6. As such, each block in the aforementioned flow chart of FIG. 6 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 7 are provided as an example. In practice, there may be additional modules, fewer modules, different modules, or differently arranged modules than those shown in FIG. 7. Furthermore, two or more modules shown in FIG. 7 may be implemented within a single module, or a single module shown in FIG. 7 may be implemented as multiple, distributed modules. Additionally, or alternatively, a set of modules (e.g., one or more modules) shown in FIG. 7 may perform one or more functions described as being performed by another set of modules shown in FIG. 7.

Figure 8:
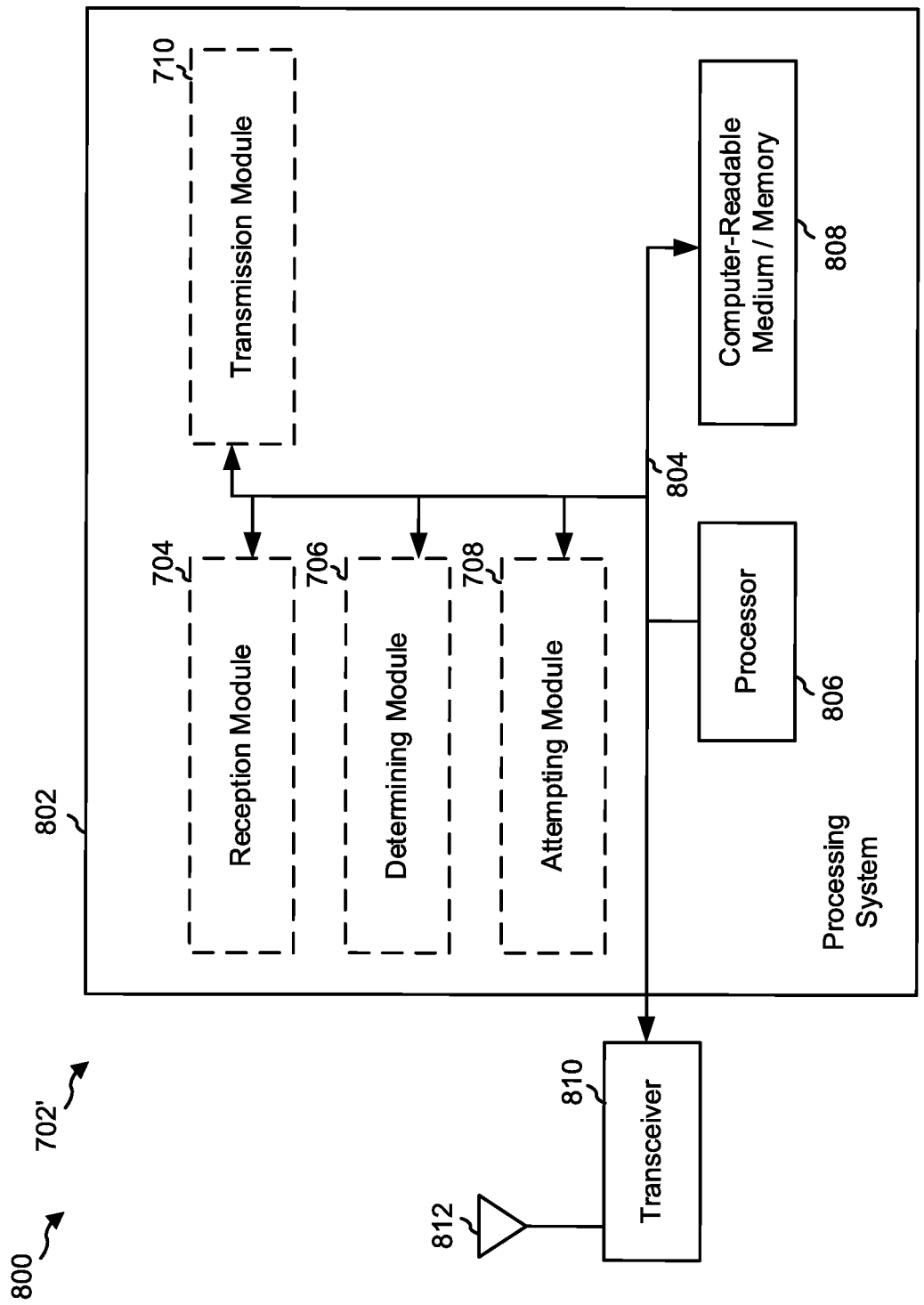
FIG. 8 is a diagram illustrating an example of a hardware implementation for an apparatus employing a processing system.

FIG. 8 is a diagram 800 illustrating an example of a hardware implementation for an apparatus 702' employing a processing system 802. The apparatus 702' may be a UE.

The processing system 802 may be implemented with a bus architecture, represented generally by the bus 804. The bus 804 may include any number of interconnecting buses and bridges depending on the specific application of the processing system 802 and the overall design constraints. The bus 804 links together various circuits including one or more processors and/or hardware modules, represented by the processor 806, the modules 704, 706, 708, 710, and the computer-readable medium/memory 808. The bus 804 may also link various other circuits such as timing sources, peripherals, voltage regulators, and power management circuits, which are well known in the art, and therefore, will not be described any further.

The processing system 802 may be coupled to a transceiver 810. The transceiver 810 is coupled to one or more antennas 812. The transceiver 810 provides a means for communicating with various other apparatus over a transmission medium. The transceiver 810 receives a signal from the one or more antennas 812, extracts information from the received signal, and provides the extracted information to the processing system 802, specifically the reception module 704. In addition, the transceiver 810 receives information from the processing system 802, specifically the transmission module 710, and based at least in part on the received information, generates a signal to be applied to the one or more antennas 812. The processing system 802 includes a processor 806 coupled to a computer-readable medium/memory 808. The processor 806 is responsible for general processing, including the execution of software stored on the computer-readable medium/memory 808. The software, when executed by the processor 806, causes the processing system 802 to perform the various functions described supra for any particular apparatus. The computer-readable medium/memory 808 may also be used for storing data that is manipulated by the processor 806 when executing software. The processing system further includes at least one of the modules 704, 706, 708, and 710. The modules may be software modules running in the processor 806, resident/stored in the computer readable medium/memory 808, one or more hardware modules coupled to the processor 806, or some combination thereof. The processing system 802 may be a component of the UE 120 and may include the memory 282 and/or at least one of the TX MIMO processor 266, the RX processor 258, and/or the controller/processor 280.

In some aspects, the apparatus 702/702' for wireless communication includes means for receiving, from a base station, a channel list indicator identifying a channel list, of a subset of channels, for frequency hopping, wherein the channel list indicator is a bit indicator identifying a set of combinatorial factors identifying the subset of channels; means for attempting to communicate with the base station using at least one channel of the subset of channels identified in the channel list; and/or the like. The aforementioned means may be one or more of the aforementioned modules of the apparatus 702 and/or the processing system 802 of the apparatus 702' configured to perform the functions recited by the aforementioned means. As described supra, the processing system 802 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 8 is provided as an example. Other examples are possible and may differ from what was described in connection with FIG. 8.

Figure 9:
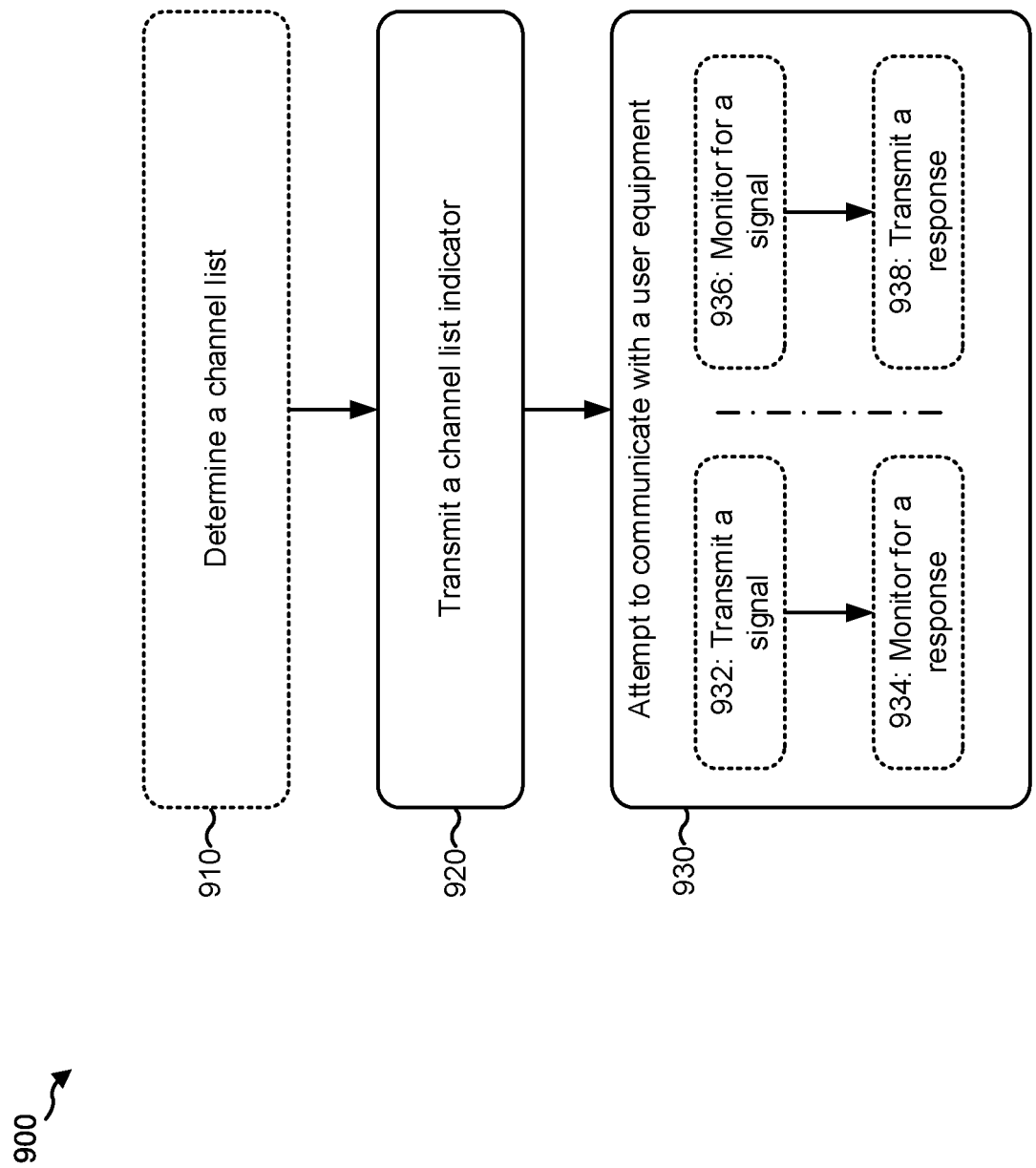
FIG. 9 is a flow chart of a method of wireless communication.

FIG. 9 is a flow chart of a method 900 of wireless communication. The method may be performed by a base station (e.g., the BS 110 of FIG. 1, the BS 750 of FIG. 7, the apparatus 1002/1002', and/or the like).

At 910, in some aspects, the base station may determine a channel list. For example, the base station (e.g., using controller/processor 240 and/or the like) may determine a channel list of a subset of channels, of a set of channels, for a user equipment to attempt to communicate with the base station using frequency hopping, as described in more detail above.

At 920, in some aspects, the base station may transmit a channel list indicator. For example, the base station (e.g., using controller/processor 240, transmit processor 220, TX MIMO processor 230, MOD 232, antenna 234, and/or the like) may transmit a channel list indicator identifying the channel list based at least in part on determining the channel list, wherein the channel list indicator is a bit indicator identifying a set of combinatorial factors identifying the subset of channels, as described in more detail above.

At 930, in some aspects, the base station may attempt to communicate with a user equipment. For example, the base station (e.g., using controller/processor 240, transmit processor 220, TX MIMO processor 230, MOD 232, antenna 234, antenna 234, DEMOD 232, MIMO detector 236, receive processor 238, and/or the like) may attempt to communicate with a user equipment using at least one channel of the channel list based at least in part on transmitting the channel list indicator to the user equipment, as described in more detail above.

At 932 and 934, in some aspects, the base station may transmit a signal, and may monitor for a response. For example, the base station (e.g., using controller/processor 240, transmit processor 220, TX MIMO processor 230, MOD 232, antenna 234, antenna 234, DEMOD 232, MIMO detector 236, receive processor 238, and/or the like) may attempt to communicate with the user equipment by transmitting a signal to the user equipment using the at least one channel of the subset of channels, and by monitoring for a response from the user equipment using the at least one channel of the subset of channels, as described in more detail above.

At 936 and 938, in some aspects, the base station may monitor for a signal, and may transmit a response. For example, the base station (e.g., using controller/processor 240, transmit processor 220, TX MIMO processor 230, MOD 232, antenna 234, antenna 234, DEMOD 232, MIMO detector 236, receive processor 238, and/or the like) may attempt to communicate with the user equipment by monitoring for a signal from the user equipment using the at least one channel of the subset of channels, and by transmitting, to the user equipment, a response to the signal using the at least one channel of the subset of channels, as described in more detail above.

Method 900 may include additional aspects, such as any single aspect or any combination of aspects described below and/or in connection with one or more other processes described elsewhere herein.

In some aspects, a quantity of channels from which the channel list is selected is static.

In some aspects, a quantity of bits of the bit indicator is based at least in part on a greatest quantity of bits to be used for the channel list indicator. In some aspects, a quantity of channels of the subset of channels is signaled using a master information block message.

In some aspects, the channel list is based at least in part on a quantity of channels from which the channel list is selected. In some aspects, the channel list indicator and a channel quantity indicator of a quantity of channels from which the channel list is selected are signaled in a common message. In some aspects, the channel list indicator is signaled using a system information block message or a master information block message transmitted on an anchor channel and an indicator of a quantity of channels in the subset of channels is signaled using another channel.

In some aspects, the channel list indicator is signaled and decoded after an alteration to the channel list. In some aspects, the set of combinatorial factors identifies one or more channels not to be included in the channel list and the subset of channels of the channel list is based at least in part on the one or more channels not to be included in the channel list. In some aspects, a size of the channel list indicator is based at least in part on a size of the set of channels.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
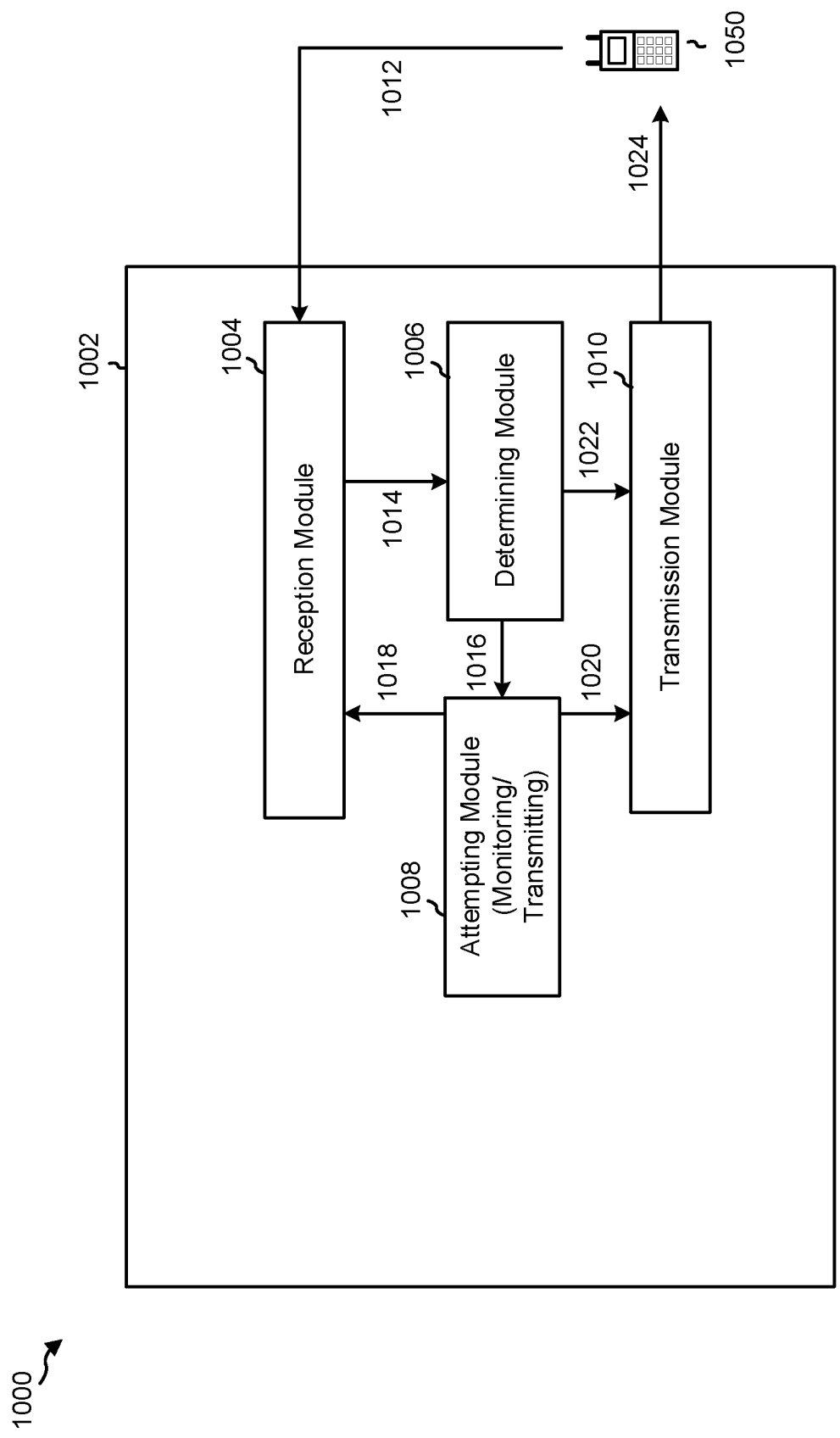
FIG. 10 is a conceptual data flow diagram illustrating the data flow between different modules/means/components in an example apparatus.

FIG. 10 is a conceptual data flow diagram 1000 illustrating the data flow between different modules/means/components in an example apparatus 1002. The apparatus 1002 may be a BS. In some aspects, the apparatus 1002 includes a reception module 1004, a determining module 1006, an attempting module 1008, and/or a transmission module 1010.

The reception module 1004 may receive, from a user equipment 1050 and as data 1012, information associated with a communication. For example, based at least in part on the user equipment 1050 determining a channel list for frequency hopping communication with the apparatus 1002, the user equipment 1050 may transmit information to the reception module 1004 using at least one channel of the channel list. In some aspects, the reception module 1004 may receive an indication that the user equipment 1050 is to communicate with the reception module 1004, which may trigger the apparatus 1002 to provide a channel list indicator for the user equipment 1050. In some aspects, the reception module 1004 may receive an indication of a change to a channel list.

The determining module 1006 may receive, from the reception module 1004 and as data 1014, information associated with determining a channel list indicator. For example, based at least in part on receiving an indication that the user equipment 1050 is to communicate with the apparatus 1002, the determining module 1006 may determine the channel list indicator. In some aspects, the determining module 1006 may determine the channel list indicator based at least in part on the reception module 1004 receiving an indication that the channel list has been altered (e.g., such as from a network scheduling entity). In some aspects, the determining module 1006 may determine a bit indicator for the channel list indicator. For example, the determining module 1006 may determine a value based at least in part on a set of combinatorial factors corresponding to channel indices for a set of channels on which the apparatus 1002 is to communicate with the user equipment 1050, such as in a frequency hopping communication system. In this case, the determining module 1006 may determine a bit representation of the value as the channel list indicator.

The attempting module 1008 may receive, from determining module 1006 and as data 1016, information associated with attempting to communicate with the user equipment 1050. For example, the apparatus 1002 may receive a channel list, and may provide data 1018 to the reception module 1004 to cause the reception module 1004 to monitor for a signal (e.g., to attempt to receive the signal from the user equipment 1050) using at least one channel included in the channel list. Similarly, the attempting module 1008 may provide data 1020 to the transmission module 1010 to cause the transmission module 1010 to transmit a signal (e.g., to attempt to transmit the signal to user equipment 1050) using at least one channel included in the channel list.

The transmission module 1010 may receive, from the determining module 1006 and as data 1022, information associated with a channel list indicator. For example, the transmission module 1010 may receive the channel list indicator and may provide, to user equipment 1050 and as data 1024, the channel list indicator, such as via a MIB message, a SIB message, and/or the like. In some aspects, the transmission module 1010 may provide another indicator, such as an indicator of a quantity of channels that are included in the channel list, an indicator of a quantity of channels from which the channels in the channel list are to be selected, and/or the like. In some aspects, the transmission module 1010 may transmit communication information. For example, the transmission module 1010 may transmit using at least one of the channels of the channel list to communicate with the user equipment 1050 based at least in part on providing the channel list indicator to the user equipment 1050.

The apparatus may include additional modules that perform each of the blocks of the algorithm in the aforementioned flow chart of FIG. 10. As such, each block in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 10 are provided as an example. In practice, there may be additional modules, fewer modules, different modules, or differently arranged modules than those shown in FIG. 10. Furthermore, two or more modules shown in FIG. 10 may be implemented within a single module, or a single module shown in FIG. 10 may be implemented as multiple, distributed modules. Additionally, or alternatively, a set of modules (e.g., one or more modules) shown in FIG. 10 may perform one or more functions described as being performed by another set of modules shown in FIG. 10.

Figure 11:
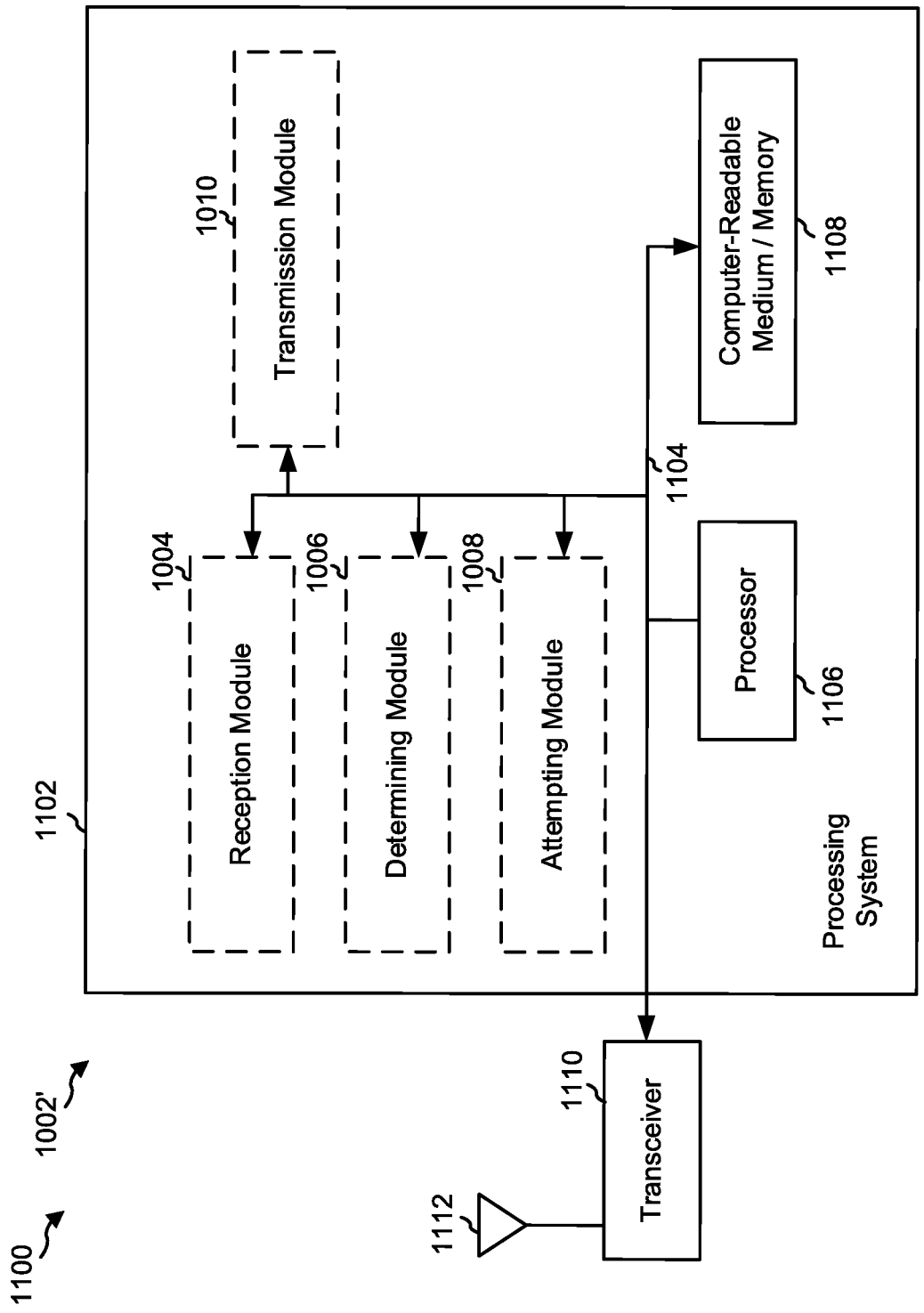
FIG. 11 is a diagram illustrating an example of a hardware implementation for an apparatus employing a processing system.

FIG. 11 is a diagram 1100 illustrating an example of a hardware implementation for an apparatus 1002' employing a processing system 1102. The apparatus 1002' may be a BS.

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware modules, represented by the processor 1106, the modules 1004, 1006, 1008, 1010, and the computer-readable medium/memory 1108. The bus 1104 may also link various other circuits such as timing sources, peripherals, voltage regulators, and power management circuits, which are well known in the art, and therefore, will not be described any further.

The processing system 1102 may be coupled to a transceiver 1110. The transceiver 1110 is coupled to one or more antennas 1112. The transceiver 1110 provides a means for communicating with various other apparatus over a transmission medium. The transceiver 1110 receives a signal from the one or more antennas 1112, extracts information from the received signal, and provides the extracted information to the processing system 1102, specifically the reception module 1004. In addition, the transceiver 1110 receives information from the processing system 1102, specifically the transmission module 1010, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described supra for any particular apparatus. The computer-readable medium/memory 1108 may also be used for storing data that is manipulated by the processor 1106 when executing software. The processing system further includes at least one of the modules 1004, 1006, 1008, and 1010. The modules may be software modules running in the processor 1106, resident/stored in the computer readable medium/memory 1108, one or more hardware modules coupled to the processor 1106, or some combination thereof. The processing system 1102 may be a component of the BS 110 and may include the memory 242 and/or at least one of the TX MIMO processor 230, the RX processor 238, and/or the controller/processor 240.

In some aspects, the apparatus 1002/1002' for wireless communication includes means for transmitting a channel list indicator identifying a channel list of a subset of channels for a user equipment to attempt to communicate with the apparatus 1002/1002' using frequency hopping, wherein the channel list indicator is a bit indicator identifying a set of combinatorial factors identifying the subset of channels; means for attempting to communicate with the user equipment using at least one channel of the subset of channels identified in the channel list; and/or the like. The aforementioned means may be one or more of the aforementioned modules of the apparatus 1002 and/or the processing system 1102 of the apparatus 1002' configured to perform the functions recited by the aforementioned means. As described supra, the processing system XX02 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 11 is provided as an example. Other examples are possible and may differ from what was described in connection with FIG. 11.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving from a base station, by a user equipment, a channel list indicator corresponding to a subset of channels of a set of channels, for frequency hopping, wherein the channel list indicator is a bit indicator identifying a set of combinatorial factors identifying the subset of channels;
receiving from the base station, by the user equipment, an indicator of a quantity of channels that are to be selected from the set of channels as the subset of channels,
wherein the user equipment receives the channel list indicator via a system information block (SIB) message on an anchor channel and receives the indicator of the quantity of channels via a master information block (MIB) message; and
attempting, by the user equipment, to communicate with the base station using at least one channel of the subset of channels identified based at least in part on the channel list indicator and the indicator of the quantity of channels.

2. The method of claim 1, wherein the attempting comprises:
transmitting a signal to the base station using the at least one channel; and
monitoring for a response to the signal.

3. The method of claim 1, wherein the attempting comprises:
monitoring for a signal transmitted from the base station using the at least one channel; and
transmitting a response to the signal.

4. The method of claim 1, wherein the channel list indicator is signaled and decoded after an alteration to a channel list.

5. The method of claim 1, wherein the set of combinatorial factors identifies one or more channels not to be included in the subset of channels.

6. The method of claim 1, wherein the set of combinatorial factors is based at least in part on a quantity of channels from which the subset of channels is to be selected.

7. The method of claim 1, wherein the set of combinatorial factors is based at least in part on the quantity of channels that are to be selected from the set of channels as the subset of channels.

8. The method of claim 1, wherein a size of the channel list indicator is based at least in part on a size of the set of channels.

9. A method of wireless communication, comprising:
transmitting, by a base station, a channel list indicator corresponding to a subset of channels of a set of channels for a user equipment to attempt to communicate with the base station using frequency hopping, wherein the channel list indicator is a bit indicator identifying a set of combinatorial factors identifying the subset of channels;
transmitting, by the base station, an indicator of a quantity of channels that are to be selected from the set of channels as the subset of channels,
wherein the base station transmits the channel list indicator via a system information block (SIB) message on an anchor channel and transmits the indicator of the quantity of channels via a master information block (MIB) message; and
attempting, by the base station, to communicate with the user equipment using at least one channel of the set of channels identified by the channel list indicator.

10. The method of claim 9, wherein the attempting comprises:
transmitting a signal to the user equipment using the at least one channel; and
monitoring for a response to the signal.

11. The method of claim 9, wherein the attempting comprises:
monitoring for a signal transmitted from the user equipment using the at least one channel; and
transmitting a response to the signal.

12. The method of claim 9, wherein the channel list indicator is signaled and decoded after an alteration to a channel list.

13. The method of claim 9, wherein the set of combinatorial factors identifies one or more channels not to be included in the subset of channels.

14. The method of claim 9, wherein the set of combinatorial factors is based at least in part on a quantity of channels from which the subset of channels is to be selected.

15. The method of claim 9, wherein the set of combinatorial factors is based at least in part on the quantity of channels that are to be selected from the set of channels as the subset of channels.

16. The method of claim 9, wherein a size of the channel list indicator is based at least in part on a size of the set of channels.

17. A user equipment for wireless communication, comprising:
a memory; and
one or more processors operatively coupled to the memory, the memory and the one or more processors configured to:
receive from a base station a channel list indicator corresponding to a subset of channels of a set of channels, for frequency hopping, wherein the channel list indicator is a bit indicator identifying a set of combinatorial factors identifying the subset of channels;
receive from the base station an indicator of a quantity of channels that are to be selected from the set of channels as the subset of channels,
wherein the channel list indicator is received via a system information block (SIB) message on an anchor channel and the indicator of the quantity of channels is received via a master information block (MIB) message; and
attempt to communicate with the base station using at least one channel of the subset of channels identified by based at least in part on the channel list indicator and the indicator of the quantity of channels.

18. The user equipment of claim 17, wherein the memory and the one or more processors, when configured to attempt to communicate, are configured to:
transmit a signal to the base station using the at least one channel; and
monitor for a response to the signal.

19. The user equipment of claim 17, wherein the memory and the one or more processors, when configured to attempt to communicate, are configured to:
monitor for a signal transmitted from the base station using the at least one channel; and
transmit a response to the signal.

20. The user equipment of claim 17, wherein the channel list indicator is signaled and decoded after an alteration to a channel list.

21. The user equipment of claim 17, wherein the set of combinatorial factors identifies one or more channels not to be included in the subset of channels.

22. The user equipment of claim 17, wherein the set of combinatorial factors is based at least in part on a quantity of channels from which the subset of channels is to be selected.

23. The user equipment of claim 17, wherein the set of combinatorial factors is based at least in part on the quantity of channels that are to be selected from the set of channels as the subset of channels.

24. A base station for wireless communication, comprising:
a memory; and
one or more processors operatively coupled to the memory, the memory and the one or more processors configured to:
transmit a channel list indicator corresponding to a subset of channels of a set of channels for a user equipment to attempt to communicate with the base station using frequency hopping, wherein the channel list indicator is a bit indicator identifying a set of combinatorial factors identifying the subset of channels;
transmit an indicator of a quantity of channels that are to be selected from the set of channels as the subset of channels,
wherein the base station transmits the channel list indicator via a system information block (SIB) message on an anchor channel and transmits the indicator of the quantity of channels via a master information block (MIB) message; and
attempt to communicate with the user equipment using at least one channel of the set of channels identified by the channel list indicator.

25. The base station of claim 24, wherein the memory and the one or more processors, when configured to attempt to communicate, are configured to:
transmit a signal to the user equipment using the at least one channel; and
monitor for a response to the signal.

26. The base station of claim 24, wherein the memory and the one or more processors, when configured to attempt to communicate, are configured to:
monitor for a signal transmitted from the user equipment using the at least one channel; and
transmit a response to the signal.

27. The base station of claim 24, wherein the channel list indicator is signaled and decoded after an alteration to a channel list.

28. The base station of claim 24, wherein the set of combinatorial factors identifies one or more channels not to be included in the subset of channels.

29. The base station of claim 24, wherein the set of combinatorial factors is based at least in part on a quantity of channels from which the subset of channels is to be selected.

30. The base station of claim 24, wherein the set of combinatorial factors is based at least in part on the quantity of channels that are to be selected from the set of channels as the subset of channels.

* * * * *